United States Patent [19]

Swinburne et al.

[11] Patent Number: 4,685,017
[45] Date of Patent: Aug. 4, 1987

[54] WRITE/PROTECT TAB ASSEMBLY FOR A FLOPPY DISC JACKET AND METHOD FOR ASSEMBLING SAME

[75] Inventors: Stephen G. Swinburne, Scarborough; Anthony L. Gelardi, Kennebunkport, both of Me.

[73] Assignee: Shape Inc., Biddeford, Me.

[21] Appl. No.: 743,388

[22] Filed: Jun. 11, 1985

[51] Int. Cl.⁴ .................. G11B 23/02; G11B 15/04; G11B 19/04
[52] U.S. Cl. .................................... 360/133; 360/60
[58] Field of Search .................... 360/133, 132, 60

[56] References Cited

U.S. PATENT DOCUMENTS

| | | | |
|---|---|---|---|
| 3,950,786 | 4/1976 | Shapley | 360/60 X |
| 4,041,537 | 8/1977 | Kishi | 360/132 X |
| 4,409,630 | 10/1983 | Saito | 360/99 |
| 4,460,930 | 7/1984 | Takahashi | 360/132 X |
| 4,530,017 | 7/1985 | Oishi et al. | 360/60 |
| 4,536,812 | 8/1985 | Oishi et al. | 360/133 |
| 4,549,240 | 10/1985 | Hodges | 360/133 |

Primary Examiner—John H. Wolff
Attorney, Agent, or Firm—Staas & Halsey

[57] ABSTRACT

A write/protect tab assembly including a substantially planar jacket base and a write/protect tab slidably mounted in a tab pocket formed in the jacket base, such that the tab is encaptured by the jacket base. The tab is alternatively encaptured by: a latch formed at the tab pocket for receiving the tab; shelf-like projections formed on the tab pocket for receiving corresponding elongated recesses formed on the sides of the tab; a cap attached to the tab with the tab pocket being disposed between the tab and the cap; or guides formed adjacent the tab pocket for receiving in sliding relation the sides of the tab. The present invention also includes a method of encapturing the tabs in the jacket base before the cover is positioned on the jacket base. The encapturing step alternatively includes: forming a latch at the tab pocket for receiving the tab; forming shelf-like projections on the tab pocket for receiving corresponding recesses formed in the tab; attaching a cap to the tab via snapping, press fitting, ultrasonically welding, swedging, or gluing; or forming guides on the tab pocket for receiving the sides of the tab.

20 Claims, 10 Drawing Figures

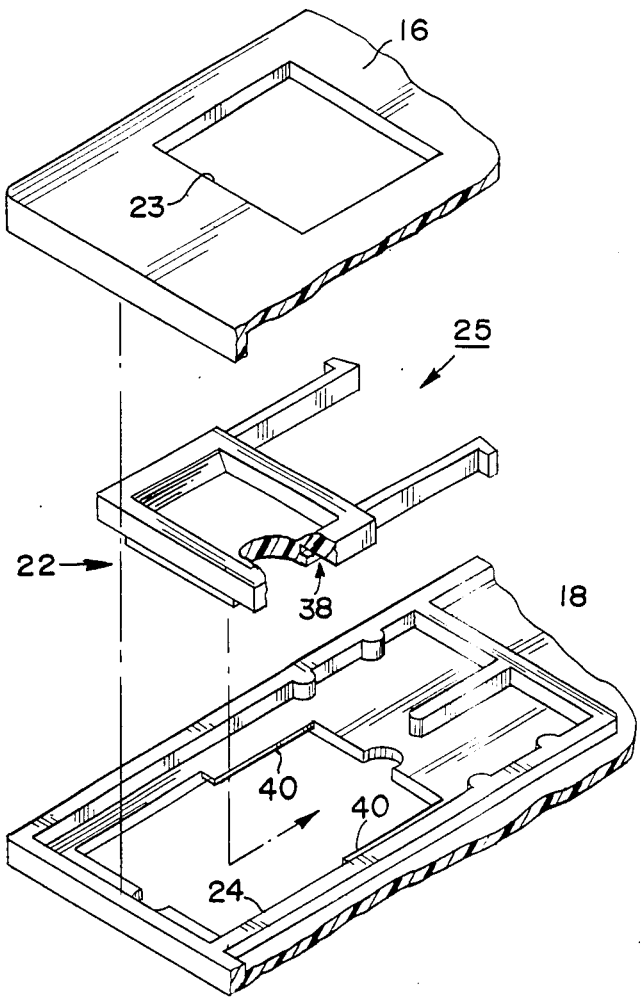
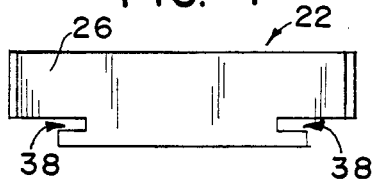
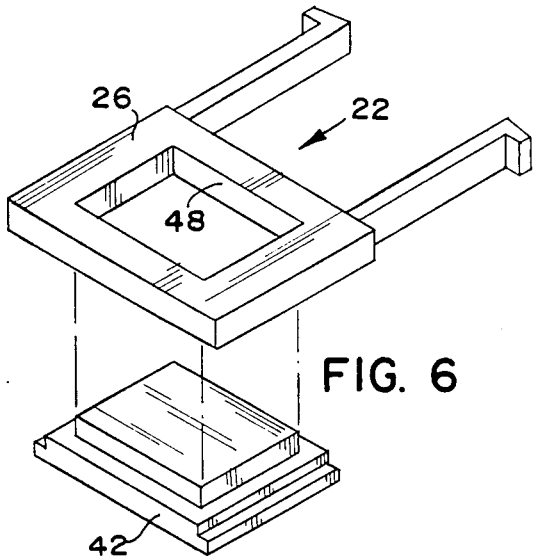
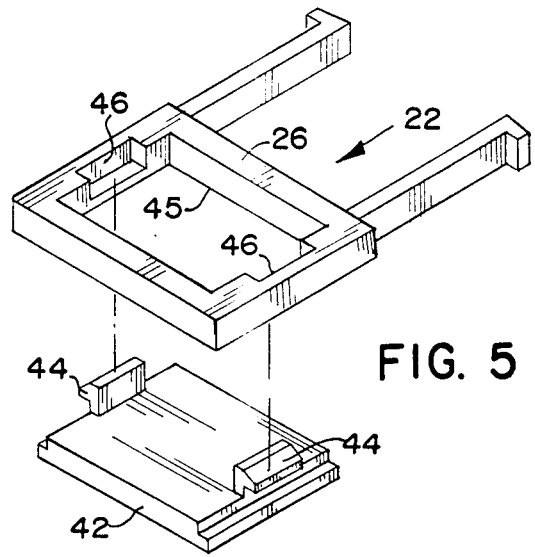

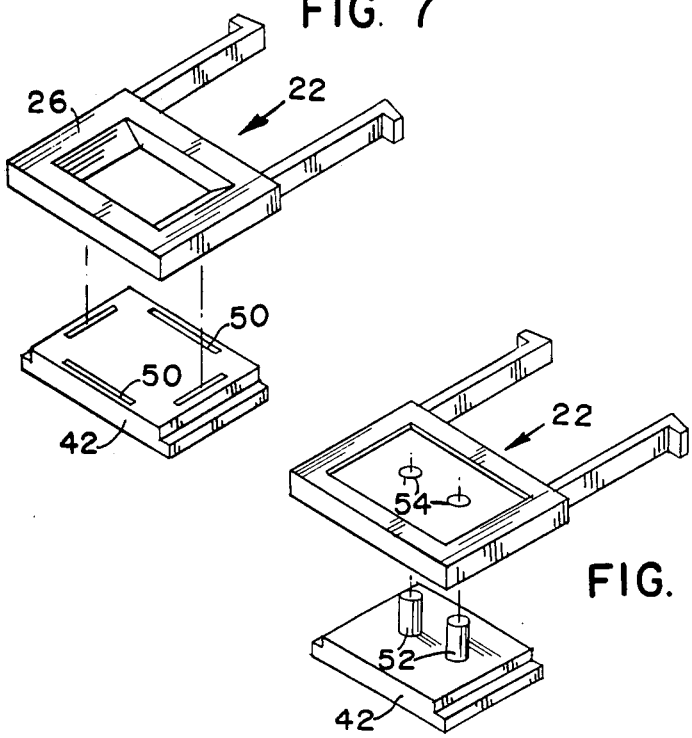
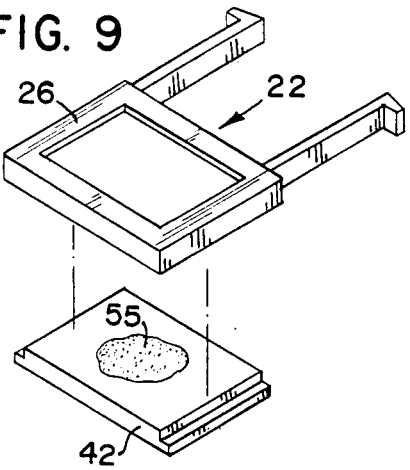
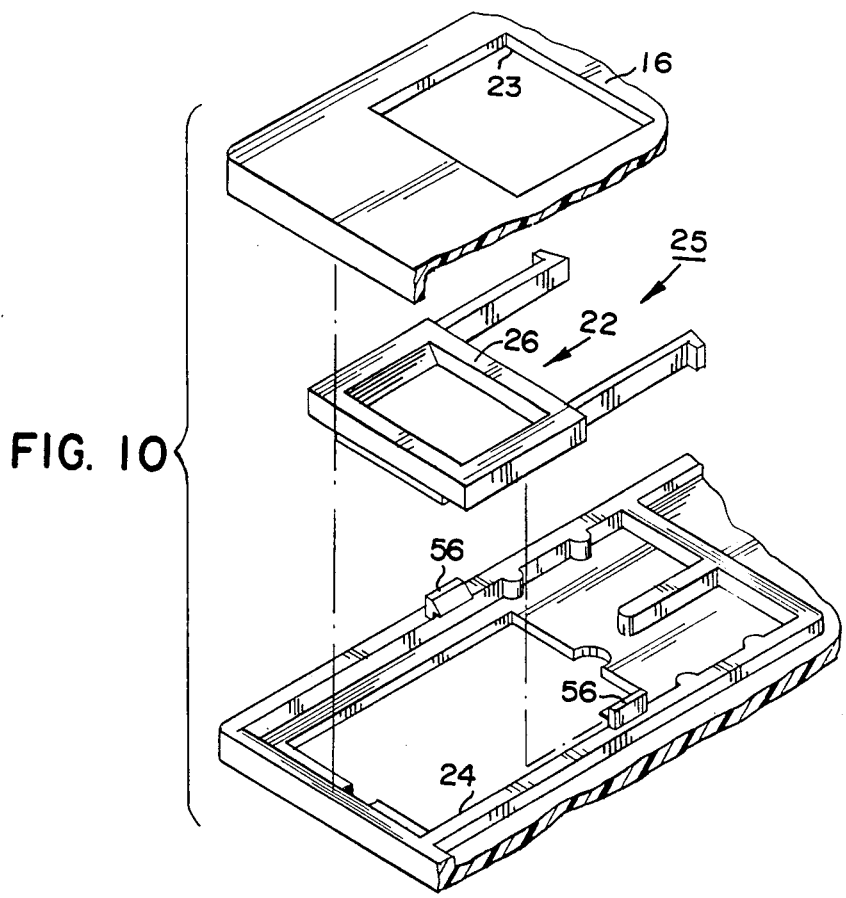

WRITE/PROTECT TAB ASSEMBLY FOR A FLOPPY DISC JACKET AND METHOD FOR ASSEMBLING SAME

BACKGROUND OF THE INVENTION

This invention relates to an data storage media and, more particularly, to an improved write/protect tab assembly for a floppy disc jacket and a method for assembling same.

As is known, information can be recorded on and/or reproduced from a data storage medium in the form of a "floppy disc" by bringing a magnetic head into contact with the disc while rotating the disc at a high speed and, at the same time, moving the magnetic head in the radial direction of the disc.

Such a floppy disc is usually enclosed in a "jacket" to prevent damage to the disc during handling. A floppy disc jacket includes, among other things, a write/-protect tab assembly which is intended to prevent inadvertent erasure of the information recorded on the disc.

For example, U.S. Pat. No. 4,409,630, issued to SAITO, discloses a write/protect tab assembly, wherein an assembled floppy disc jacket has a write/-protect tab slidably mounted in a write/protect tab pocket. In the write/protect tab assembly of the '630 patent, as in other prior art write/protect tab assemblies, the write/protect tab does not become "encaptured" in the floppy disc jacket until the base and cover of the jacket are ultrasonically welded together during final assembly. Encaptured is defined as being held in place so that the write/protect tab will not fall out of the floppy disc jacket when handled. Accordingly, there are several instances before final assembly of the conventional jacket when, unfortunately, the write/-protect tab merely falls out of the jacket base and disrupts production.

Most particularly, prior to ultrasonically welding the jacket cover to the base, but after inserting the floppy disc and temporarily positioning the cover, the disc is quality tested. If the disc is not up to particular quality standards, the cover must be removed from the base and the disc is discarded. Often, at this stage of production, the tab falls out during handling. When a new disc is placed in the jacket, the write/protect tab must be re-inserted in the tab pocket before the cover can be replaced on the base and the testing repeated. Of course, this type of assembly is time and cost inefficient.

Another important drawback of the conventional assembly is related to floppy disc manufacturer buying requirements. These manufacturers prefer to load their own floppy disc into the jacket, test the quality of the disc, and then ultrasonically weld the jacket cover to the base. They prefer to take no part in the preassembly process, including insertion of the write/protect tab into the tab pocket. Of course, the conventional assembly forces such a manufacturer to insert the write/-protect tab, since it falls out if the jacket is shipped with the write/protect tab originally in place.

In light of the above, the prior art still does not provide a write/protect tab assembly for a floppy disc jacket and a method for assembling same which are capable of the most cost- and time-efficient automated assembly.

SUMMARY OF THE INVENTION

Accordingly it is an object of the present invention to provide a write/protect tab assembly for a floppy disc jacket and a method for assembling same which are capable of simplifying the assembly process by encapturing the tab in the jacket base before the cover is in place.

It is another object of the present invention to provide a write/protect tab assembly for a floppy disc jacket and a method for assembling same, wherein the tab can be reliably encaptured throughout production without significant structural or aesthetic changes being made to the jacket.

Finally, it is an object of the present invention to provide a write/protect tab assembly for a floppy disc jacket and a method for assembling same, wherein during production, a machine can simply and automatically move the write/protect tab into the encapturing position, where it thereafter remains until moved intentionally.

To achieve the foregoing and other objects of the invention and in accordance with the purposes of the invention there are provided the following write/-protect tab assembly for a floppy disc jacket and a method for assembling same.

The assembly includes: (a) a substantially planar jacket base; (b) a write/protect tab slidably mounted in a tab pocket formed in the jacket base; and (c) means for encapturing the write/protect tab relative to the jacket base. The encapturing means alternatively comprises: a latch formed at the tab pocket for receiving the write/-protect tab; shelf-like projections formed on the inner edges of the tab pocket for receiving corresponding elongated recesses formed on the sides of the write/-protect tab; a cap fixedly attached to the write/protect tab with the write/protect tab pocket being disposed between the write/protect tab and the cap; or guides formed adjacent the write/protect tab pocket for receiving in sliding relation the sides of the write/protect tab.

The method includes the step of encapturing the write/protect tab in the jacket base before the cover is positioned on the base. The encapturing step includes one of the following further steps: forming a latch at the tab pocket for receiving the write/protect tab; forming shelf-like projections on the inner edges of the tab pocket for receiving corresponding recesses formed in the tab; fixedly attaching a cap to the tab via snapping, press fitting, ultrasonically welding, swedging or gluing; or forming guides at the tab pocket for receiving the sides of the write/protect tab.

The present invention eliminates the disadvantages of the prior art, such as time and cost consuming production of floppy discs and jackets, and provides automated assembly of write/protect tabs into floppy disc jackets.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is an exploded perspective view of a second embodiment of the write/protect tab assembly for a floppy disc jacket and method for assembling same according to the present invention;

FIG. 4 is a rear view of the write/protect tab shown in FIG. 3;

FIG. 5 is an exploded perspective view of a third embodiment of the write/protect tab assembly for a floppy disc jacket and method for assembling same according to the present invention;

FIG. 6 is an exploded perspective view of a fourth embodiment of the write/protect tab assembly for a floppy disc jacket and method for assembling same according to the present invention;

FIG. 7 is an exploded perspective view of a fifth embodiment of the write/protect tab assembly for a floppy disc jacket and method for assembling same according to the present invention;

FIG. 8 is an exploded perspective view of a sixth embodiment of the write/protect tab assembly for a floppy disc jacket and method for assembling same according to the present invention;

FIG. 9 is an exploded perspective view of a seventh embodiment of the write/protect tab assembly for a floppy disc jacket and method for assemlbing same according to the present invention; and FIG. 10 is an exploded perspective view of an eighth embodiment of the write/protect tab assembly for a floppy disc jacket and method for assembling same according to the present invention.

DETAILED DESCRIPTION OF THE PREFERRED EMBODIMENTS

Figure 1:
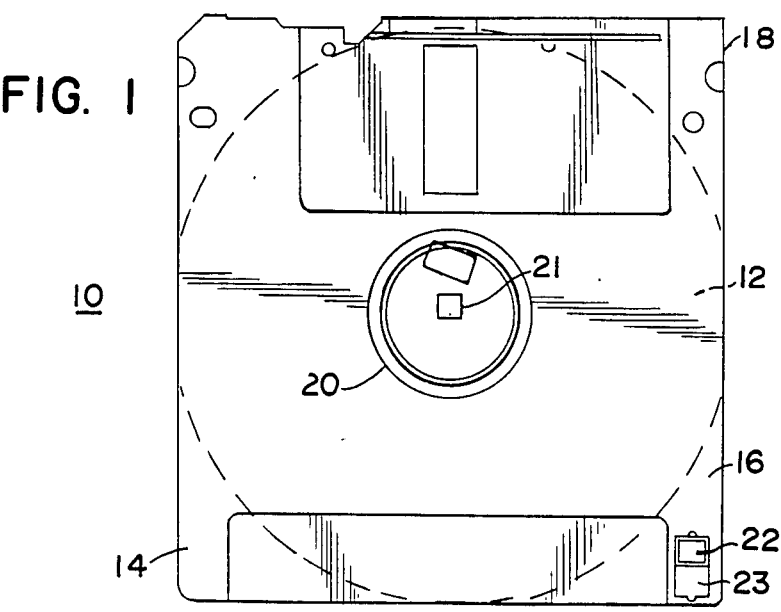
FIG. 1 is a top plan view of a data storage medium according to the present invention in the form of a floppy disc and jacket.

FIG. 1 is a top plan view of a data storage medium according to the present invention indicated by reference numeral 10, generally including a floppy disc 12 and a floppy disc jacket 14.

Preferably, the floppy disc 12 is 3.5" in diameter, is composed of a thin polymer having a thickness of, for example, 0.08 mm, and is provided with a magnetic layer on at least one surface thereof, upon which a magnetic head (not shown) moves in contact.

The jacket 14 is preferably of a flat rectangular shape and includes a cover 16 and a base 18 arranged in substantially parallel relation. Both the cover 16 and the base 18 may be molded or formed of a synthetic resin so as to completely enclose the floppy disc 12 sandwiched therebetween. The jacket 14 is further provided with a slidable member known as a write/protect tab 22 supported between an opening 23 in the cover 16 and a tab pocket 24 (see FIG. 2) formed in the base 18 for preventing inadvertent erasure of the information signals from the floppy disc 12.

Openings 20 and 21 are provided at the centers of the jacket 14 and the floppy disc 12, respectively, which are used in rotating the floppy disc 12 during operation.

Figure 2:
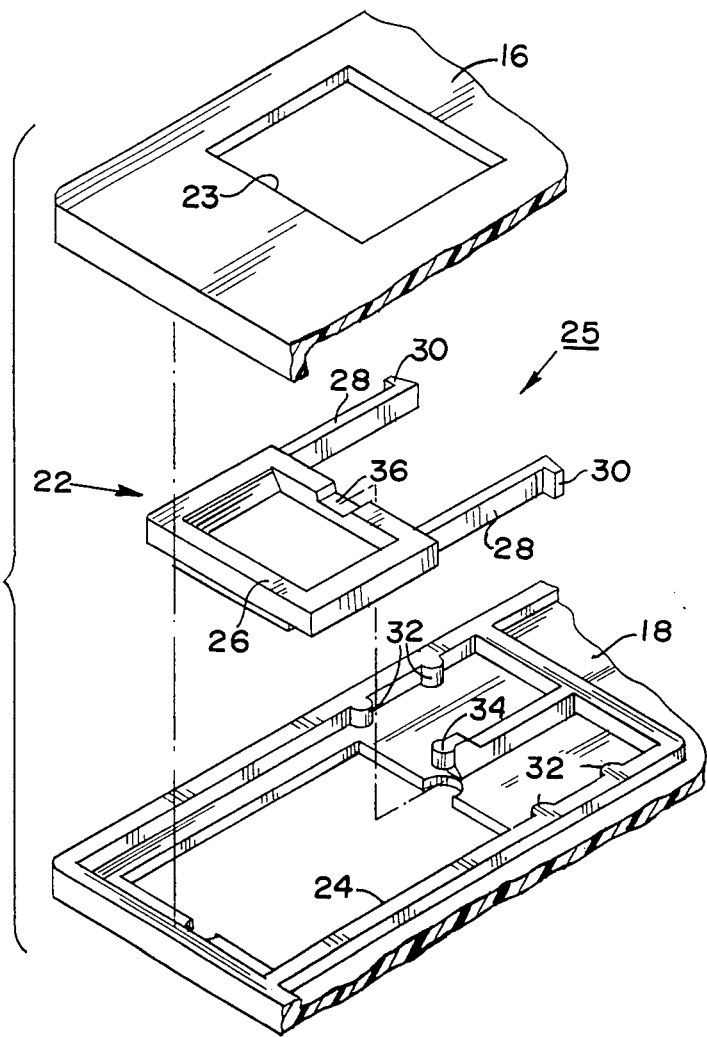
FIG. 2 is an exploded perspective view of a first, preferred embodiment of the write/protect tab assembly for a floppy disc jacket and method for assembling same according to the present invention.

FIG. 2 illustrates the first, preferred embodiment of the write/protect tab assembly 25 for a floppy disc jacket and method for assembling same according to the present invention. As can be seen, the write/protect tab 22 comprises a rectangular body 26 and two parallel arms 28 extending therefrom. Each arm 28 terminates outwardly in a projection 30 which cooperates with rounded projections 32 formed at the tab pocket 24 to produce incremental forward and backward movement of the tab 22 relative to the pocket 24. A latch 34 is also formed at the tab pocket 24 for temporarily receiving a recess 36 formed in the tab 22 and, accordingly, encapturing the tab 22 during production.

This first embodiment requires little structural modification of the write/protect tab 22 relative to the prior art structure. That is, the jacket base 18 and tab 22 remain substantially unchanged while the tab pocket 24 is slightly modified so that the tab 22 is encaptured in the pocket 24 when pushed in the forward/write position. The snap action that temporarily encaptures the tab 22 in the forward position prevents the tab 22 from sliding out from under the latch 34 on the base 18 until desired.

FIGS. 3 and 4 illustrate a second embodiment of the write/protect tab assembly 25 for a floppy disc and method for assembling same according to the present invention. In this embodiment, recesses 38 are formed on either side of the tab 22 to interface with shelf-like projections 40 formed on the tab pocket 24. Formation of the recesses 38 in the tab can be accomplished by molding a one piece tab or by joining two pieces to fabricate the tab 22. The tab 22 is first placed in the pocket 24 in the area without the shelf-like projections 40 and is then slid on over the shelf-like projections 40 to interface with the recesses 38.

FIGS. 5-9 illustrate the third through seventh embodiments, respectively, of the write-protect tab assembly 25 for a floppy disc jacket and a method for assembling same according to the present invention. These embodiments share the common feature of fixedly attaching by various means a cap 42 to the write/protect tab 22 with the write/protect tab pocket 24 being disposed between the write/protect tab 22 and the cap 42.

More particularly, as shown in FIG. 5, the cap 42 and the write/protect tab 22 are attached via snaps 44 formed on the cap 42, which are inserted through an opening 45 in the tab 22 and are received by corresponding recesses 46 formed at the sides of the write/protect tab 22.

In FIG. 6, the cap 42 and write/protect tab 22 are attached by press fitting the cap 42 into a corresponding opening 48 formed centrally of the rectangular body 26 of the write/protect tab 22.

In FIG. 7, the cap 42 and the write/protect tab 22 are attached via ultrasonic welding at their interface using a plurality of energy directors 50 which are known in the art.

In FIG. 8, the cap 42 and the write/protect tab 22 are attached by inserting a pair of swedging posts 52 formed in the cap 42 into corresponding circular openings 54 formed in the write/protect tab 22.

Further, in FIG. 9, the cap 42 and the write/protect tab 22 are attached by glue applied at their interface.

FIG. 10 illustrates an eighth embodiment of the write/protect tab assembly 25 for a floppy disc jacket and a method for assembling same according to the present invention. In this embodiment, the tops of the sides of the tab 22 are slidingly encaptured by two guides 56 formed inwardly on the sides of the tab pocket 24.

In comparison with the prior art assembly and method described above, the present invention requires only simple modification of existing tooling and equipment, and does not visually or operationally change the write/protect tab characteristics. For example, after the jacket cover and base are welded together, a consumer or a technician is unable to perceive a difference in operation or the way the tab actually looks in the jacket.

In addition, the present invention offers much greater liberties in terms of how the write/protect tab can be handled during production. As discussed above, traditionally there were several areas in the assembly process where the tab would fall out when installed prior to securing the base to the cover, for example during quality testing of the floppy disc. With floppy disc acceptability levels presently ranging from 40% to 80%, the advantage of the tab being encaptured when the cover and base are separated can clearly be seen.

Further, as suggested above, since floppy disc manufacturers prefer to load their own floppy discs and prefer not to perform any preassembly such as insertion of the write/protect tab, the present invention allows shipment of a floppy disc jacket preassembled with the tab in place.

Finally, with the present invention, the actual initial method of placing the tab into the jacket base does not change. However, once in place, a finger on an assembly machine can, e.g., simply move the tab according to the first embodiment under the latch where it remains through the rest of the assembly process. In regard to the remaining embodiments two through eight, the write/protect tab is also reliably encaptured throughout production.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

I claim:

1. A write/protect tab assembly for a floppy disc jacket, comprising:
   (a) a substantially planar jacket base;
   (b) a write/protect tab slidably mounted for movement from a first position to a second position parallel to the plane of the jacket base in a tab pocket formed in the jacket base; and
   (c) means formed on the jacket base and the tab for encapturing the write/protect tab relative to the jacket base to prevent the tab from moving in a direction substantially perpendicular to the plane of the jacket base.

2. The assembly as recited in claim 1, wherein the means comprises:
   a latch formed on the jacket base for receiving a recess formed in the write/protect tab.

3. The assembly as recited in claim 1, wherein the means for encapturing comprises:
   guides formed at the tab pocket for receiving in sliding relation the sides of the write/protect tab.

4. The assembly as recited in claim 1, wherein the means for encapturing comprises:
   shelf-like projections formed on the tab pocket for receiving corresponding elongated recesses formed on the write/protect tab.

5. The assembly as recited in claim 1, wherein the means for encapturing comprises:
   a cap attached to the write/protect tab with the write/protect tab pocket being disposed between the write/protect tab and the cap.

6. The assembly as recited in claim 5, wherein the cap and write/protect tab are attached via snaps formed on the cap which are inserted through an opening formed in the write/protect tab and are received by corresponding recesses formed in the write/protect tab.

7. The assembly as recited in claim 5, wherein the cap and write/protect tab are attached by press fitting the cap into a corresponding opening formed in the write/protect tab.

8. The assembly as recited in claim 5, wherein the cap and write/protect tab are attached via ultrasonic welding at their interface using energy directors located on the cap.

9. The assembly as recited in claim 5, wherein the cap and write/protect tab are attached by inserting swedging posts formed in the cap into corresponding openings formed in the write/protect tab.

10. The assembly as recited in claim 5, wherein the cap and write/protect tab are attached by glue applied at their interface.

11. A method for assembling a write/protect tab into a write/protect pocket of a substantially planar floppy disc jacket base, comprising the step of:
    (a) forming first means on the tab and the jacket base for allowing movement from a first position to a second position of the tab parallel to the plane of the jacket base; and
    (b) forming second means on the write/protect tab and jacket base for encapturing the tab relative to the jacket base and preventing the tab from moving in a direction substantially perpendicular to the plane of the jacket base such that the write/protect tab does not fall out of the jacket base.

12. The method as recited in claim 11, wherein the step further comprises the step of:
    forming a latch adjacent the tab pocket for receiving the write/protect tab.

13. The method as recited in claim 11, wherein the step further comprises the step of:
    forming guides at the tab pocket for receiving in sliding relation the sides of the write/protect tab.

14. The method as recited in claim 11, wherein the step further comprises the step of:
    forming shelf-like projections on the tab pocket for receiving corresponding elongated recesses formed on the write/protect tab.

15. The method as recited in claim 11, wherein the step further comprises the step of:
    attaching a cap to the write/protect tab with the write/protect tab pocket being disposed between the write/protect tab and the cap.

16. The method as recited in claim 15, wherein the attaching step comprises the step of:
    forming snaps on the caps for receiving corresponding recesses formed in the write/protect tab.

17. The method as recited in claim 15, wherein the attaching step comprises the step of:
    press fitting the cap into a corresponding opening formed in the write/protect tab.

18. The method as recited in claim 15, wherein the attaching step comprises the step of:
    ultrasonically welding the cap to the write/protect tab using energy directors located on the cap.

19. The method as recited in claim 15, wherein the attaching step comprises the step of:
    inserting swedging posts formed on the cap into corresponding openings formed in the write/protect tab.

20. The method as recited in claim 15, wherein the attaching step comprises the step of:
    gluing the interface of the cap and write/protect tab.

* * * * *